Feb. 14, 1961   B. J. CARRICO   2,971,997
SAMPLING THERMOCOUPLE
Filed March 6, 1958
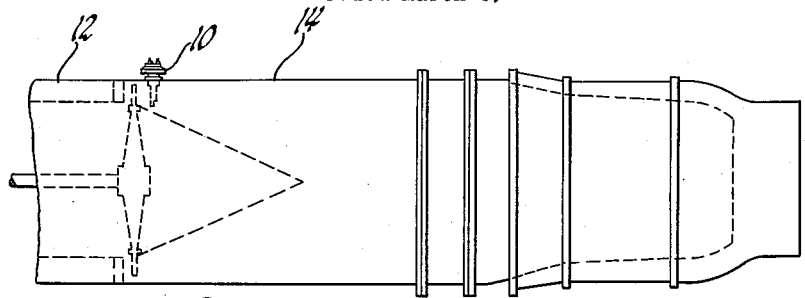
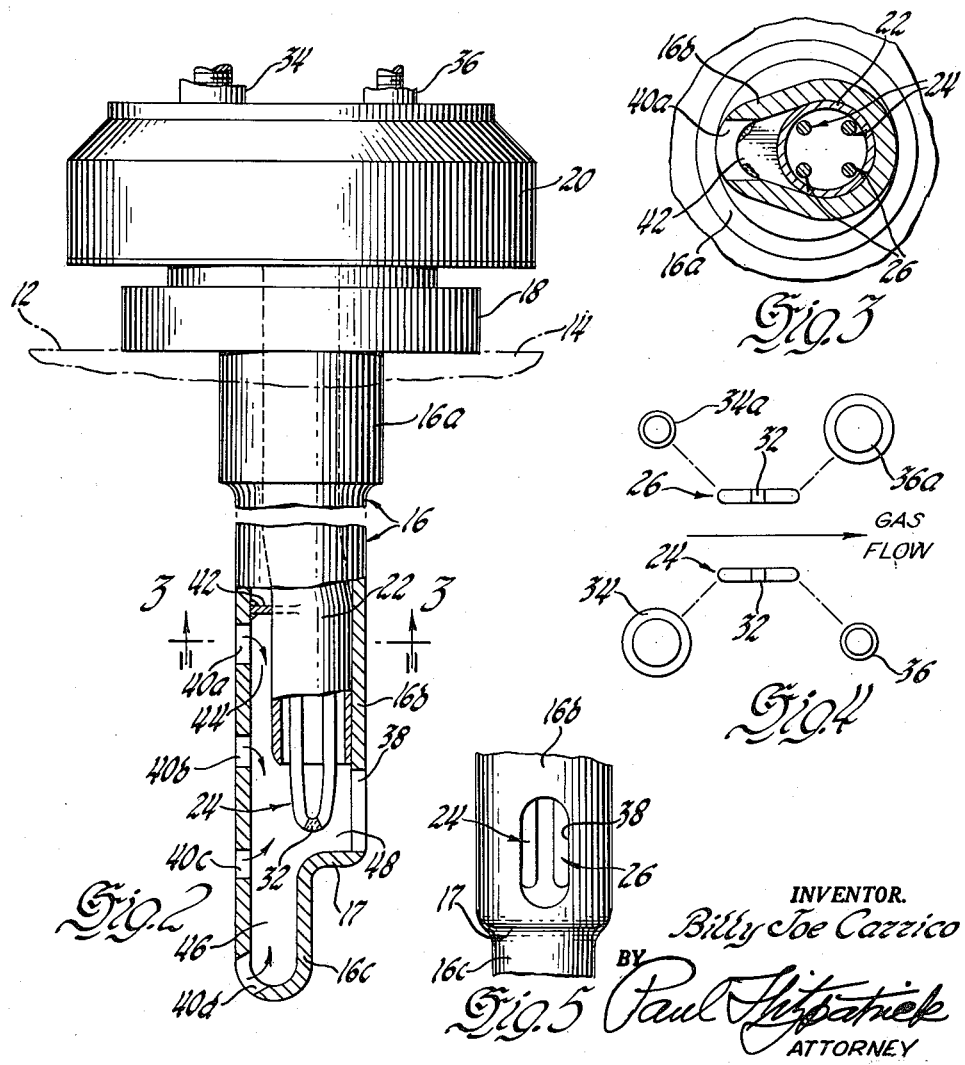
INVENTOR.
Billy Joe Carrico
BY Paul Fitzpatrick
ATTORNEY

United States Patent Office 2,971,997
Patented Feb. 14, 1961

2,971,997
SAMPLING THERMOCOUPLE

Billy J. Carrico, Indianapolis, Ind., assignor to General Motors Corporation, Detroit, Mich., a corporation of Delaware Filed Mar. 6, 1958, Ser. No. 719,613

6 Claims. (Cl. 136—4)

This invention relates to thermocouple type gas probes and in particular to sampling gas probes for measuring the temperature of hot gases as they pass through gas ducts.

Where it is desired to measure the temperature of a gas stream flowing at high velocities as in a gas turbine, in order to obtain a valid average temperature it has been necessary to employ a large number of thermocouples located at different points in the path of the gas. In order to reduce the number of thermocouples required, sampling type thermocouples have been developed such as that shown and described in Patent No. 2,806,075 and application Ser. No. 369,856, filed July 23, 1953 by Edwin C. Schunke, entitled Thermocouple now Patent No. 2,820,839, issued January 21, 1958. In these constructions samples of gas are taken at various points and combined to pass out of the sampling probe through a single outlet with a thermocouple junction located adjacent the outlet.

In order to obtain a true sampling it is necessary that the amount of gas taken in at each of the sampling points be such that equal quantities of gas from sampling points pass the thermocouple junction. Also, more rapid response sampling, hence greater transient accuracy is obtained by having the thermocouple junction located in a concentrated flow area.

It is therefore an object of the invention to provide a gas sampling thermocouple probe which will accurately measure the average temperature of gases at a plurality of points in the path of a gas stream. It is a further object to provide a sampling thermocouple probe that will sample equal quantities of gases from a plurality of points and by directing means direct these quantities in a concentrated flow past a thermocouple junction. These and other objects of the invention will become apparent by reference to the following detailed description taken in connection with the accompanying drawing in which:

Figure 1 is a diagrammatic view indicating a gas probe embodying the invention mounted in the tail pipe of the gas turbine engine;

Figure 2 is an enlarged partially sectioned view showing the construction of the gas probe indicated in Figure 1;

Figure 3 is a sectional view taken on the line 3—3 of Figure 2;

Figure 4 is a diagrammatic view showing the relative locations of the thermocouple wires and thermocouples in the gas stream; and Figure 5 is an enlarged downstream elevational view of the lower end of the probe shown in Figure 2.

Referring now to the drawing and particularly to Figure 1, gas probe 10 is shown extending through the wall 12 of a gas duct 14 of a conventional gas turbine engine. As seen in Figure 2 the sampling probe includes an elongated collector tube 16 extending through the supporting wall 12 of a gas duct. The collector tube 16 has a large circular portion 16a reducing into an ovate portion 16b and finally a smaller terminal portion 16c. The collector tube 16 extends from a mounting boss 18. A wire carrying tube 22 having a wire terminal head 20 extends through the mounting boss 18 into the collector tube 16 concentric with the large circular portion 16a. The wire carrying member 22 is offset at its lower end, as seen in Figures 2 and 3, to fit snugly within the large radius area of the ovate portion 16b.

Extending through the wire carrying member 22 which may be filled with an insulating material such as magnesium oxide, are two independent thermocouples generally indicated as 24 and 26, each thermocouple comprising a pair of dissimilar wires, such as Chromel and Alumel, connected to form junctions 32. As seen in Figure 4, the thermocouple wires extend through the probe 16 and tube 22 and connect with terminals 34, 36 and 34a and 36a.

The sampling tube 16 has a plurality of spaced upstream inlet apertures 40a, 40b, 40c and 40d and a single downstream oval shaped outlet aperture or port 38. The space between the wire carrying tube 22 and the inside of the ovate portion 16b of the collector tube forms a flow directing passage 44 that connects the inlet apertures 40a and 40b with a mixing and discharge passage 48. Passage 48 is formed by horizontal wall portion 17 intermediate the ovate portion 16b and the small circular portion 16c and the lower end of the wire carrying tube 22. The small circular portion 16c of the collector tube forms a gas directing passage 46 for gases entering inlet apertures 40c and 40d and also connecting with the mixing and discharge passage 48. The cross-sectional area of the upper passage 44 and the lower passage 46 are preferably made equal by choosing the proper diameters of the tube 22, ovate portion 16b and small circular portion 16c of the collector tube. The inlet ports 40a and 40d located at the greatest distance from the discharge passage 48 and port 38 are larger than the ports 40b and 40c located closer to the passage 48. This increased area compensates for the frictional and flow losses of the gases entering the outer inlet ports 40a and 40d which have a great distance to travel and which must make a greater change in direction than the gases entering the smaller ports 40b and 40c. The total area of the ports 40a, 40b, 40c and 40d in the preferred embodiment is equal to or greater than the area of the discharge port 38. A gas seal or baffle 42 is located between the wire carrying tube 22 and the inner wall of the collector probe to prevent gases from flowing up into the collector probe.

It will be seen that by proper selection of the sizes of the inlet apertures 40 and outlet aperture 38 the flow directing passages 44, 46 and 48 will act to provide a highly concentrated flow of equal quantities of gas from a plurality of points to pass relatively close to the thermocouple junctions 32 of the thermocouples 24 and 26. This highly concentrated flow provides a more rapid response to changes in the gas temperature approaching that of an exposed junction type thermocouple.

The preferred embodiment shown on the figures is only illustrative and other arrangements may be utilized to carry out the invention. For example, the flow directing passages in the collector probe may be formed by either varying the cross-sectional shape and area of the collector tube, by providing insert members in the tube 16, or by varying the shape and cross-sectional area of the wire carrying tube 22. The probe may be cast, may be formed by stamping or may be machined. It is obvious that other changes may be made without departing from the spirit and the scope of the invention which is limited only by the following claims.

What is claimed is:

1. A gas probe comprising a body portion adapted to be supported by the wall of a gas duct and a gas collector tube having an inner end adjacent said body portion and an outer end extending into said duct, a downstream gas outlet hole in said tube intermediate its inner and outer ends, a plurality of axially spaced upstream inlet holes in said tube, a wire carrying member of smaller cross-section than the cross-section of said tube extending into the same from said body portion to form a first gas passage between the inside of said tube and outside of said member for conducting gases from some of said inlet holes to said outlet hole, a pair of wires extending through and out of said member and connected to form a junction adjacent said outlet hole, said tube having its outer end portion of reduced internal cross-section to form a second gas passage, one of said inlet holes opening into said second gas passage whereby said second gas passage will conduct gases from said one inlet to said outlet hole of substantially the same cross-section as said first gas passage.

2. In a gas probe for collecting equal quantities of gas from a plurality of points in a gas stream and directing said gas in a concentrated flow past a given point, the combination including a walled collector tube extending outward from a supporting wall of a gas duct with the tube axis normal to the flow of gases in said duct, a plurality of gas inlet ports in the wall of said tube axially spaced on the upstream side of said tube, a gas outlet port in the wall of said tube on the downstream side of said tube, said outlet port located outwardly of at least one of said inlet ports and inwardly of at least one other of said ports, and a member longitudinally extending into said tube from said wall to a point adjacent said outlet port, said member and the wall of said tube forming a first flow directing passage therebetween connecting said one port with said outlet port, said collector tube having a portion outwardly of said outlet port having a reduced internal cross-sectional area substantially equal to the cross-sectional area of said first flow directing passage, said other inlet port opening into said reduced internal cross sectional portion, said reduced portion forming a second flow directing passage connecting said other inlet port with said outlet port, whereby the quantity of gases flowing through said first and second flow directing passages will be substantially equal.

3. In a gas probe for collecting equal quantities of gas from a plurality of points in a gas stream and directing said gas in a concentrated flow past a given point, the combination including a walled collector tube extending outward from a supporting wall of a gas duct with the tube axis normal to the flow of gases in said duct, a plurality of gas inlet ports in the wall of said tube axially spaced on the upstream side of said tube, a gas outlet port in the wall of said tube on the downstream side of said tube, said outlet port located outwardly of some of said inlet ports and inwardly of other ports, a wire carrying member longitudinally extending into said tube from said wall to a point adjacent said outlet port, said wire carrying member and the wall of said tube forming a first flow directing passage therebetween connecting said some ports with said outlet port, the portion of said collector tube having a portion outwardly of said outlet port having a reduced internal cross-sectional area substantially equal to the cross-sectional area of said first flow directing passage, said other inlet ports opening into said reduced internal area portion, said reduced area portion forming a second flow directing passage connecting said other inlet ports with said outlet port, whereby the quantity of gases flowing through said first and second flow directing passages will be substantially equal, and wires extending through and out of said member and joined together to form a junction adjacent said outlet port.

4. In a gas probe for collecting equal quantities of gas from a plurality of points in a gas stream and directing said gas past a given point, the combination including a walled collector tube extending outward from a supporting wall of a gas duct with the tube axis normal to the flow of gases in said duct, a plurality of gas inlet ports in said tube axially spaced on the upstream side of said tube, a gas outlet port in said tube on the downstream side of said tube, said outlet port located outwardly of some of said inlet ports and inwardly of other ports, and a member longitudinally extending into said tube from said wall to a point adjacent said outlet port, said member and the wall of said tube forming a first flow directing passage therebetween connecting said some ports with said outlet port, the portion of said collector tube located outwardly of said outlet port having a reduced internal cross-sectional area substantially equal to the cross-sectional area of said first flow directing passage, said other inlet passages opening into said reduced portion, said reduced portion forming a second flow directing passage connecting said other inlet ports with said outlet port, said some inlet ports being of decreasing size toward said wall away from said outlet port, and said other inlet ports being of decreasing size toward the outer end of said tube away from said outlet port, whereby the quantity of gases from each of the inlet ports reaching said outlet port will be substantially equal.

5. In a gas probe for collecting equal quantities of gas from a plurality of points in a gas stream and passing said gas past a thermocouple junction to measure the average temperature of gases from said points, the combination of a collector member extending from a supporting wall of a gas duct transversely of said duct, said collector member having an inner ovate portion adjacent said wall joining with an outer reduced circular portion remote from said wall, a first group of gas inlet ports in the ovate portion of said member transversely spaced on the upstream side of said member, a second group of inlet ports in the circular portion of said member, a downstream facing gas outlet port in said ovate portion adjacent the junction between said portions, a circular element extending into said ovate portion to a point inwardly of said outlet port, said ovate portion and said circular element forming a first gas directing passage between the first group of inlet ports and said outlet port, said second group of inlet ports opening into said outer circular portion, said outer circular portion forming a second gas directing passage between said second group of inlet ports and said outlet port, said passages and said inlet ports being of such size as to cause equal flow of gases from each of said ports to discharge from said outlet port, and a thermocouple junction in said member adjacent said outlet port in the path of said gas discharge.

6. In a gas probe for collecting equal quantities of a gas from a plurality of points in a gas stream and passing said gas past a thermocouple junction to measure the average temperature of gases from said points, the combination including a collector member extending from a transversely supporting wall of a gas duct, a plurality of gas inlet ports in said member transversely spaced on the upstream side of said member, a gas outlet port in said member on the downstream side of said member, said member having reduced internal cross sectional area portions therein forming flow directing passages, one of said flow directing passages being formed between said collector member and a thermocouple member longitudinally extending into said collector member, another of said flow directing passages being formed in a reduced cross sectional area end portion of said collector member, each of said reduced internal area portions containing at least one of said inlet ports, said inlet ports opening into said passages for connection thereby with said outlet port, said passages and said inlet ports being of such size and shape as to cause equal flow of gases from each inlet port to discharge from said outlet port, and a thermocouple junction in said member adjacent said outlet port in the path of said gas discharge.

References Cited in the file of this patent
UNITED STATES PATENTS

| | | |
|---|---|---|
| 2,496,835 | Ward | Feb. 7, 1950 |
| 2,806,075 | Gaubatz | Sept. 10, 1957 |
| 2,820,839 | Schunke | Jan. 21, 1958 |
| 2,820,840 | Cantlin et al. | Jan. 21, 1958 |
| 2,870,233 | Comer | Jan. 20, 1959 |